July 4, 1933.  F. W. GAY  1,916,927
SWITCHING A SPARE LINE
Filed Dec. 19, 1930
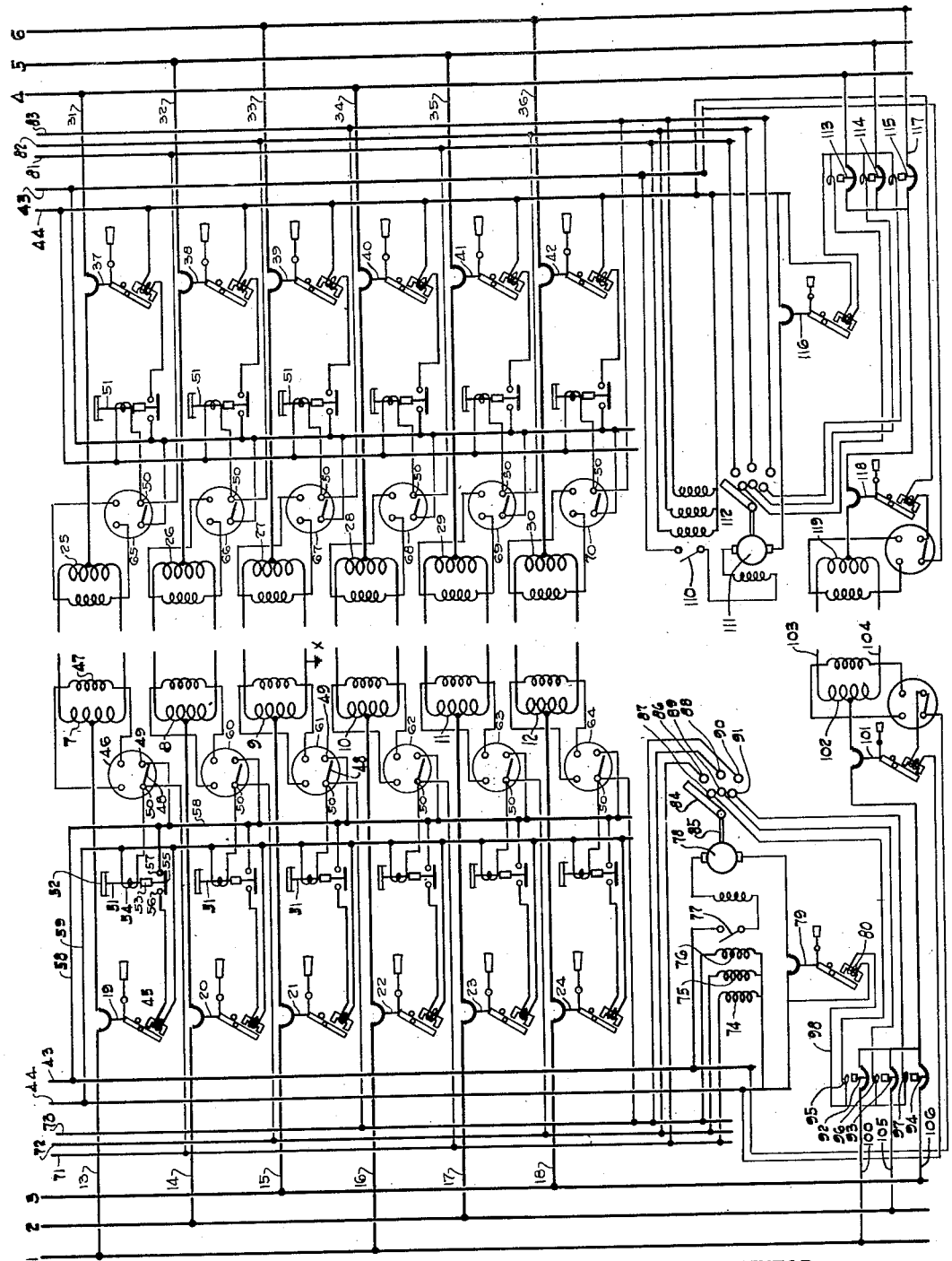
INVENTOR
Frazer W. Gay Patented July 4, 1933

1,916,927

UNITED STATES PATENT OFFICE

FRAZER W. GAY, OF NEWARK, NEW JERSEY

SWITCHING A SPARE LINE

Application filed December 19, 1930. Serial No. 503,462.

This invention relates to a novel three phase transmission system in which the total reactance is maintained at a minimum value during periods of line trouble and in which the reactance is maintained substantially uniformly distributed among the three phases.

In the transmission of electric power as heretofore practiced, no reliable means for selecting an individual grounded phase conductor has been available, hence it has been customary to switch out all three phase conductors of a three phase transmission circuit upon the occurrence of a ground or other fault on only one of the three conductors of the transmission line. This practice has resulted in the installation of a complete three phase circuit in addition to the number of three phase circuits necessary to carry the load.

It is well known that the ability of an electric transmission line to carry power is inversely proportional to its impedance. In the case of an overhead transmission line carrying heavy currents at high voltage, the reactance of the line is so great with respect to its resistance that the ability of the line to carry power is approximately in inverse ratio to its reactance. The policy heretofore followed of switching out of the circuit a complete three phase circuit after a fault has resulted in greatly increasing the reactance of the transmission at the very moment when a minimum reactance was required to maintain stability during that critical interval of power surging which immediately follows the switch off of a fault.

It is an object of this invention immediately upon the grounding of a conductor to bring that conductor and the grounded neutral of the transformer banks to substantially the same potential, allowing only a predetermined current to flow in the grounded conductor so as to promptly operate the combination conductor selecting and phase selecting relays at both ends of the faulty conductor, as fully described in my patent application Serial No. 501,608 and in case the fault is not thereby removed switch a sound conductor in multiple with said faulty conductor before said faulty conductor is removed from the circuit.

It is a principal object of this invention to maintain the normal low reactance in a three phase transmission line by continuing a faulty conductor in service until a sound conductor is switched into its place.

It is a further object of this invention to provide a novel relay scheme adapted to cooperate with the switching of a spare line into the place of a faulty line so as to maintain a substantially uniform distribution of reactance among the three phases during several possible types of faults. In case one or two, three phase circuits are used, it is proposed to provide a spare phase circuit conductor adapted to be switched into the place of a faulty conductor so as to maintain this substantially equal distribution of reactance among the three phases. In case three or more three phase circuits are operated in multiple between two stations, a fault on a single phase conductor will immediately cause said phase conductor to be switched out of circuit, since there will still be two sound conductors in this phase and the unequal distribution of reactance among the three phases will not be so great as to become serious. Provision will be made so that an operator can switch one of three conductors in an unaffected phase into the position of a faulty conductor in case two such faulty conductors should develop in any one phase.

Referring to the drawing,

The single figure is a diagrammatic representation of a three phase transmission system employing the method of the present invention in which 1, 2, 3 represent the three conductors of a station bus and 4, 5, 6 represent the three conductors of a substation bus. Bus 1 is connected to the mid point of a transformer primary 7 by lead 13 through single pole circuit breaker 19. In the same manner, transformer primaries 8, 9, 10, 11, 12 are connected to bus conductors 2, 3, 1, 2, 3 by leads 14, 15, 16, 17 and 18 through circuit breakers 20, 21, 22, 23, and 24. At the substation end of the transmission circuit, transformer primaries 25, 26, 27, 28, 29, and 30 are connected to bus conductors 4, 5, 6 and 4, 5, 6 by leads 31, 32, 33, 34, 35, 36 respectively through single pole breakers 37, 38, 39, 40, 41, and 42. The construction and arrangement of equipment connected with each lead as 13 and with each breaker as 19 is as follows. A coil 47 is wound in inductive relation to the mid tapped primary winding 7 and this secondary winding 47 is connected to the operating coil of relay 46. Note: The construction of primary winding 7 and secondary winding 47 is fully described in my patent application Serial No. 501,608. Operating winding of relay 46 when energized closes switch 48 bridging contacts 49 and 50. Contact 49 is connected by lead 58 to positive control bus 43. An auxiliary relay 51 restrained by an air dash pot 52 has an armature 53 lifted by a coil 54. Coil 54 has one terminal connected to contact 50 and the other terminal connected to lead 59 which forms part of the negative control bus 44. Armature 53 of auxiliary relay 51 carries a contact arm 55 which bridges contacts 56 and 57. Contact 57 is connected to the positive bus 43 by lead 58 and contact 56 is connected to the negative bus 44, 59 through trip coil 45 of breaker 19. Similar time delay auxiliary relays 51 are associated with the other eleven relays as 60, 61, 62, 63, and 64 at the sending or station end and relays 65, 66, 67, 68, 69, and 70 at the receiving or substation end. The function of the relays 51 is merely that of causing a time delay in the tripping of the circuit breakers as 19, 20, 21, etc. in order that the switching mechanism of this invention may have ample time to switch the spare line in place of a faulty line before the faulty line is removed from electric connection with the system by the operation of its single pole circuit breakers at the sending and receiving end. It is intended that there should also be a slight time delay in the operation of relay 46 and 60 to 70 inclusive, so that the arc suppressor which may be furnished with this method of equipment if desired may have an opportunity to function and perhaps remove the fault without the switching of the line out of service as fully explained in my patent application Serial No. 501,608. The contact 50 of relay 46 is also connected to phase selector bus 71. Relay 62 is also connected in the same phase as relay 46 and its contact 50 is also connected to phase selector bus 71. Relays 60 and 63 have their contacts 50 connected to phase selector bus 72 and relays 61 and 64 have their contacts 50 connected to phase selector bus 73. At the receiving or substation end of the line, relays 65 and 68 have their contacts 50 connected to phase selector bus 81. Relays 66 and 69 have their contacts 50 connected to phase selector bus 82 and relays 67 and 70 have their contacts 50 connected to phase selector bus 83. Phase selector busses 71, 72, and 73 are connected each to one terminal of coils 74, 75, and 76 respectively. The other ends of coils 74, 75, and 76 are connected to the negative control bus 44. Any one of coils 74, 75, 76 if energized will close contactor 77 and connect motor 78 across positive bus 44 and negative bus 43 through circuit breaker 79. Motor 78 is connected by shaft 85 to controller arm 84. Controller arm 84 as it is revolved by shaft 85 closes in succession contacts 86, 87, and 88, 89 and 90, 91. Contact 88 is connected to phase selector bus 72. Contact 90 is connected to phase selector bus 73. Contact 87 is connected to the coil 95 of contactor 92. Contact 89 is connected to the coil 96 of contactor 93. Contact 91 is connected to the coil 97 of contactor 94. The other ends of coils 95, 96, and 97 are connected by lead 98 through trip coil 80 of breaker 79 to the negative control bus 44. The closing of contactor 92 connects station bus 1 through lead 100 and circuit breaker 101 to auto transformer primary 102 to the end terminals of which are connected transmission lines 103 and 104. The closing of contactor 93 connects station bus 2 through lead 105 and circuit breaker 101 to transmission lines 103, 104 and the closing of contactor 94 connects station bus 3 through lead 106 and breaker 101 with transmission lines 103, 104.

The operation of the invention is as follows. If a fault should develop on one of the transmission lines, say that pair connected to the primary 9 of station bus 3 as at X, an unbalanced current would flow to ground through one half of primary 9 and this would induce magnetism in winding 9 and would induce a voltage in the secondary winding inductively associated with winding 9. This voltage would cause relay 61 to start operating switch 48. If the arc suppressor, as fully explained in my patent application Serial No. 501,608 was not able to clear the fault at X, switch 48 would close and energize phase selector bus 73. The energizing of phase selector bus 73, which in turn energizes coil 76, closes contact 77. The closing of contact 77 starts motor 78 rotating which revolves controller arm 84 clockwise across contacts 86, 87 and 88, 89 until contacts 90, 91 are reached. Contact 90 is connected to phase selector bus 73 which we have seen has been energized by the closing of switch 48 of relay 61. Since contact 91 is connected to coil 97 of contactor 94, contactor 94 immediately closes and the current passing from positive control bus 43, switch clip 49 of relay 61, switch 48, contact 50, phase selector bus 73, contact 90, control arm 84, contact 91, coil 97, lead 98, trip coil 80, to negative bus 43, not only closes contactor 94 but also trips circuit breaker 79, thus opening the circuit of motor 78 and stopping motor 78 with its connected controller arm 84 bridging contacts 90 and 91 so that contactor 94 remains energized and station bus 3 is connected by lead 106 through circuit breaker 101 to transmission wires 103 and 104. This operation is carried forward very rapidly and before time delay auxiliary relay 51 functions to trip circuit breaker 21 and thereby clear the fault at X from station bus 3.

The same operation takes place at the receiving substation since auto transformer primary 27 is in multiple with auto transformer primary 9 through its connected primary leads, and the fault at X causes the functioning of relay 67 to energize phase selector bus 83. The energizing of phase selector bus 83 closes switch 110 and starts motor 111, causing contact arm 112 to bridge progressively the contacts operating contactors 113, 114, 115. When the contacts controlling contactor 115 are reached this contactor is closed, since phase selector bus 83 is energized breaker 116 is tripped, stopping motor 111 and leaving contactor 115 closed, thereby leaving substation bus 6 connected by lead 117 through contactor 115 and circuit breaker 118 to the mid point of auto transformer 119 which in turn has its end terminals connected to transmission wires 103 and 104. Therefore the circuit between station bus 3 and substation bus 6 is closed before circuit breakers 21 and 39 are tripped and disconnect fault X from both receiving and sending ends of the circuit.

It will be evident to one skilled in the art that a fault on a transmission circuit connected to say auto transformer primaries 8 and 26 will cause contact arms 84 and 112 to stop when contact arms 84 and 112 cause the closing of contactors 93 and 114, since phase selector busses 72 and 82 would then be energized by relays 60 and 66 and breakers 79 and 116 would be instantly tripped when the energized contacts controlling contactors 93 and 114 were reached.

It is obvious that this invention can be used with one three phase transmission system having three pairs of lines, or with two three phase transmission systems having six pairs of lines, or with a three phase transmission system having any desired number of pairs of lines per phase.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In combination in a transmission system; a three phase sending bus, a three phase receiving bus, conducting means connecting each phase of said sending bus with a corresponding phase of said receiving bus, a circuit breaker at said sending and at said receiving end for switching each said conducting means into and out of circuit and a spare conductor, selector switches at the sending end adapted to connect said spare conductor to any desired phase of said sending bus selector switches at the receiving end adapted to connect said spare conductor to any desired phase of said receiving bus and relay means arranged upon the occurrence of a ground on one said conducting means to operate said selector switches to connect said spare conductor in multiple with said faulty conducting means, said relay means thereafter functioning to trip the circuit breakers connecting said faulty conducting means to said system.

2. In combination in a transmission system; a three phase sending bus, conducting means connecting each said phase of said sending bus with a corresponding phase of said receiving bus, transformer means at said sending end and at said receiving end of each said conducting means adapted to induce a corresponding E. M. F. at said sending and at said receiving end of said conducting means upon the occurrence of a fault on said conducting means, a spare conductor, selector switches arranged to connect said spare conductor to any desired phase of said sending bus and a correponding phase of said receiving bus and relay means cooperating with said transformer means to connect said spare conductor in multiple with a said conducting means upon the occurrence of a fault on said conducting means.

3. In combination, in a polyphase transmission system having power phase busses at its sending end and load phase busses at its receiving end, a plurality of line conductors, a plurality of single pole circuit breakers, certain of said circuit breakers being arranged to respectively connect respective line conductors to respective power phase busses at the sending end, and others of said circuit breakers being arranged to respectively connect said respective line conductors to respective load phase busses at the receiving end, a spare line conductor, selector switches at the sending end adapted to connect said spare line conductor to any desired one of said power phase busses, selector switches at the receiving end adapted to connect said spare line conductor to any desired one of said load phase busses, and means arranged, upon the grounding of any one of said line conductors, to cause the operation of said selector switches and effect the switching of said spare conductor into circuit in the place of the grounded line conductor.

4. In combination, in a transmission system having a power sending end and a power receiving end, a three phase sending bus at the sending end of said system, a three phase receiving bus at the receiving end of said system, plural conducting means, each respective conducting means serving a connect a respective phase of said sending bus with a corresponding phase of said receiving bus, a plurality of circuit breakers, a respective one of said circuit breakers being included in a respective conducting means at the sending end of said system, and a respective one of said circuit breakers being included in a respective conducting means at the receiving end of said system, the two circuit breakers in each conducting means serving to switch the said conducting means into and out of circuit, a spare conducting means, selector switches at the sending end adapted to connect said spare conducting means to any desired phase of said sending bus, selector switches at the receiving end adapted to connect said spare conducting means to any desired phase of said receiving bus, and relay means arranged, upon the occurrence of a fault on one of said conducting means, to effect the operation of said selector switches to thereby connect said spare conducting means in multiple with said faulty conducting means.

5. In combination, in a transmission system arranged to connect two spaced locations, a plurality of electric transmission wires constituting a power circuit to carry power between said two locations, a spare wire, switches arranged to disconnect any transmission wire from said power circuit, switches adapted, upon the occurrence of a fault on any one of said transmission wires, to connect said spare wire in multiple with said faulty transmission wire, and relay means cooperating with said switches and arranged to cause said switches to first effect the connection of said spare wire in multiple with a faulty transmission wire, and second, to effect the disconnection of said faulty wire from said system.

In testimony, that I claim the invention set forth above I have hereunto set my hand this 10th day of December, 1931.

FRAZER W. GAY.